March 22, 1966 C. R. WOODBURN 3,241,626
WEIGHT INDICATING APPARATUS
Filed June 29, 1964 3 Sheets-Sheet 1

Inventor
Charles R. Woodburn
By George A. Mulwell
Attorney

3,241,626
WEIGHT INDICATING APPARATUS
Charles R. Woodburn, 440 Terraine Ave.,
Long Beach, Calif.
Filed June 29, 1964, Ser. No. 378,724
6 Claims. (Cl. 177—137)

This invention relates to a weight indicating apparatus and is more particularly concerned with an apparatus for determining the gross weight of a loaded transporting vehicle or truck.

As the number and sizes of trucks has increased it has become increasingly more necessary to limit and control the weight of laden trucks so as to prevent damage to highways, and the like, over which such trucks travel.

In order to prevent damage to roadways and highways, every state has established laws restricting the operation of trucks over a particular size and weight to certain highways and has further established limits on the gross weight of such trucks, which can legally travel over these designed roads or highways.

The load limits established by the various government agencies are expressed in terms of weight per axle or related pairs of wheels, in the case of trucks having independent wheel suspension systems, or gross weight of the vehicle.

In the case of interstate highways and other highways were federal funds are expended, the federal government has imposed similar restrictions.

In the event of violation of the laws thus imposed, a trucker is ordinarily fined a substantial amount, and it is not infrequently that he is required to either remove his vehicle from the highway and arrange for the assistance of another vehicle to take a portion of his load, or return to his shipping point and correct the overload condition, either of which alternatives is extremely costly of time and is extremely inconvenient.

Every year the trucking industry expends great sums of money in fines imposed for operating overloaded trucks over highways, and the like, and experiences great and substantial losses in time and in good will as a result of being forced to correct these breaches of the law in one or the other of the manner set forth above.

It is to be noted that while the trucking industry suffers, as set forth above, the states and the public suffer equally, though less noticeably or spectacularly, due to the premature, fatiguing and breaking down of the highways, resulting from operation of overloaded transport vehicles thereover.

The conventional method of determining the weight of trucks is by using a large stationary scale upon which an entire truck, or a portion thereof, is positioned. Accordingly, the weight of trucks can only be determined at those stations or locations which have the necessary scales and weighing apparatus.

Since such scales are scarce and cannot be located at each and every location that a truck or trucks are loaded, it is not surprising that many violations occur and considerable damage to highways is inflicted.

In the past, many efforts have been made to provide a simple, inexpensive, dependable and accurate means for determining the weight of the load or burden placed upon trucks, so that the operators thereof can control and determine the exact load and the resulting weight of his vehicle on the highway or roads when and as the truck is being loaded. By the provision of such a means, the possibility of overloading a truck and all the adverse effects resulting therefrom could be conveniently avoided.

Such attempts have been wanting in one or more respects and, as a result, have not been found to be commercially and/or practically feasible.

The earliest efforts along these lines, to applicant's knowledge, involves the placement of spring scales between the frame and the axles of a truck. Due to fatigue of the scales and to the interference of the spring and suspension means between the axles and the frames of the trucks, such efforts failed, as they were inaccurate and undependable.

Subsequent to the above, hydraulic and electrical or electronic means, arranged between the axles and the frames of trucks, were tried out, in an effort to determine the weight of the load applied thereto. These means were, in effect, measuring the deflection of the springs and/or suspension means and did not, in fact, read the direct load between the frames and the axles. Accordingly, and since the suspension means, involving springs and the like, are not stable, such attempts have failed for want of stability and accuracy.

Along these same lines, efforts have been made to measure the load on trucks by the application of strain gages on the springs of the suspension means, between the frames and the axles of the trucks, but such means were found wanting for the reasons given above, that is, the springs are not sufficiently stable and uniform to afford a reliable and dependable reading.

To applicant's knowledge, the last efforts along these lines has involved the placement of strain gages on the axles of trucks, which gages are intended to measure the deflection imposed on or through the axles by the load transmitted therethrough. Since the axles of trucks will yield and take permanent sets according to the loads applied thereto, and accordingly to the road conditions over which they are operated, this effort fails for want of accuracy and dependability.

Mechanical and hydraulic weighing means are inherently wanting for use in determining the weight distributed onto and through the axles and wheel suspension of trucks due to the wide displacement of the axles and suspension means, and due to the resulting problems of correlating the operation thereof and of accumulating and relating the information or date therefrom.

It is recognized that the most feasible and practical means for obtaining the desired end results must be electrical or electronic in nature.

To applicant's knowledge, nobody has, to this date, provided a suitable electrical means for weighing or otherwise determining the weight of a load on a truck which reads or indicates the direct load or forces exerted onto and/or through the axles and/or the suspension means related thereto.

In all suspension means presently employed in truck constructions, there is one or more locations or points where the load imposed on and through the construction is concentrated and is direct, and where the variable and unstable effects of springs and other components of the suspension means are of no direct effect.

The present invention comprises the use of resistance load cells or transducers arranged between two elements or parts of the suspension means between which the direct load or loads imposed on and through said suspension means are transmitted. Each resistance cell, or each group of series-related resistance cells is connected in a bridge circuit with standard resistors. By means of a suitable switch arrangement these bridge circuits may be selectively connected with a galvanometer, an electromotive force, and a variable resistor. The variable resistors is calibrated in terms of load units. Consequently, when a bridge circuit is connected with the galvonameter circuit, there will be a deflection of the galvanometer. By adjusting the variable resistor until the galvanometer reads "zero," it can be quickly determined from the calibrated scale on the resistor the load which is on the cell or series of cells. While this is the basic nature of the invention, other circuitry is provided whereby the total weight of all of the cells, collectively, may be obtained with a single reading. As is indicated above, all of the cells associated with a single axle or with the suspension means of a pair of related wheels are connected or related to each other so that the total load on the particular axle or the pair of related wheels is obtained at one reading.

The controls for this invention, which comprise the galvanometer, potentiometer, and the selector switches are preferably assembled together in a single unit. This unit is mounted in the cab of the vehicle. With the controls of this invention so located, the operator of the vehicle can easily and conveniently ascertain the load of his vehicle.

With the above general description of the invention, it can be seen that this invention embodies a structure which is very simple in nature and can be inexpensively installed upon a vehicle. Further, this system gives a rapid and accurate determination of the weight of a laden or loaded vehicle and the resulting weight of said vehicle on the highway.

It is an object of this invention to provide a system for quickly and accurately determining the axle loads and the total load on a vehicle.

It is another object of this invention to provide a system for selectively determining the total load and the individual axle load on a vehicle.

It is a further object of my invention to provide a system of the character referred to having load cells related to the suspension system of each axle to transduce the direct load applied on, to and through the axle and a circuit whereby either the individual axle loads or the total load exerted upon the several axles of a truck may be easily determined by suitably connecting the cells.

It is an additional object of my invention to provide an apparatus or a system of the character referred to which involves the arrangement and placement of resistance load cells between related parts and/or portions of a suspension system of a truck, where the direct load is transmitted.

It is another object of this invention to provide a load indicating system of the character referred to which is such that it can be easily, conveniently and advantageously applied to any of the suspension systems now commonly in use in the trucking industry.

Various other objects and features of this invention will be fully understood from the following detailed description of typical preferred forms and applications of my invention, throughout which description reference is made to the accompanying drawings, in which:

FIG. 7 is an isometric view of a portion of a trailer construction, showing the fifth wheel coupling means related thereto and embodying the present invention;

FIG. 17 is a wiring diagram of my new apparatus; and

Figure 1:
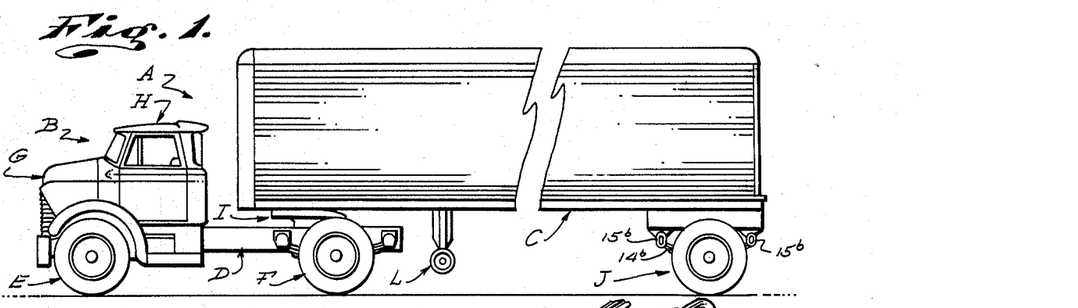
FIG. 1 is a side elevational view of a typical truck construction.

In FIG. 1 of the drawings I have shown a typical truck construction A, which construction includes, generally, a tractor B and a trailer C. The tractor B includes a frame D, a front supporting and steering wheel assembly or system E, a rear supporting and driving wheel assembly or suspension system F, a motor compartment G, a driver cab H, and a fifth wheel assembly or means I. The trailer C includes an elongate van-like body, wheel suspension means J at the rear end of the van-like body, fifth wheel coupling means K at the front or forward end of the body (see FIG. 7) and leg-supporting means L beneath the forward portion of the van body adapted to support the forward end portion of the trailer when it is disconnected from the tractor.

Figures 2, 3, 4, 5, 6:
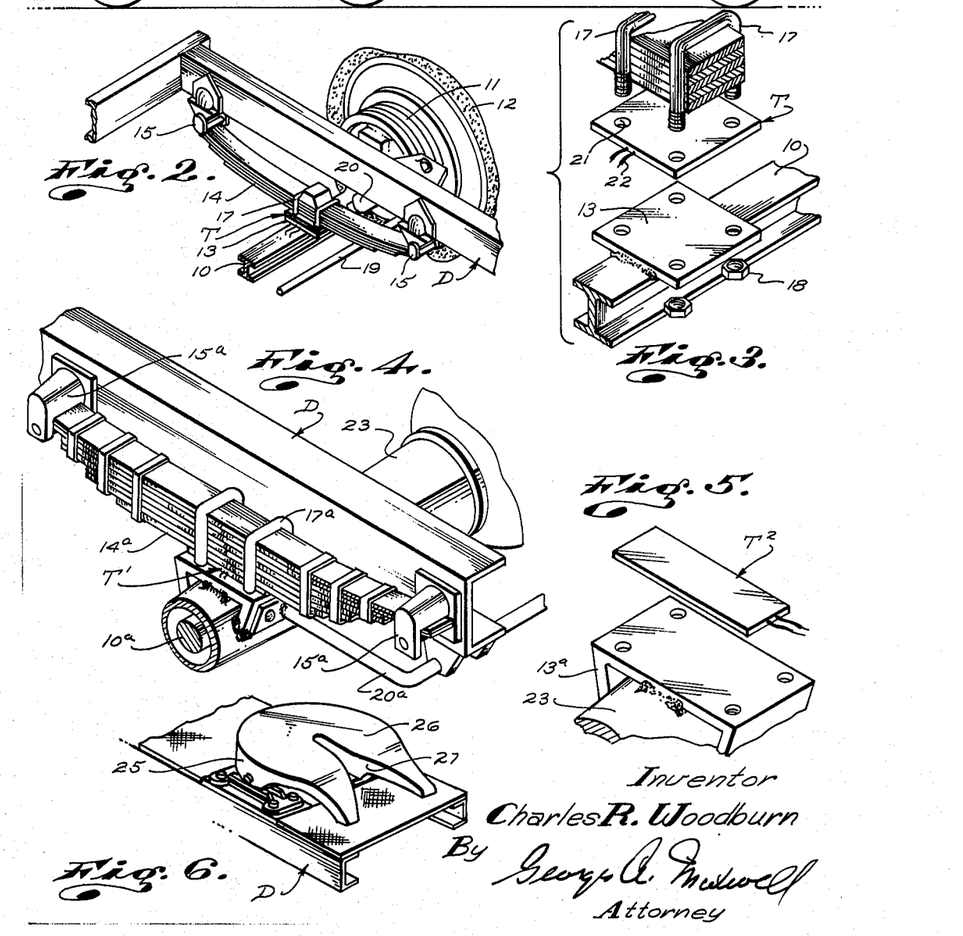
FIG. 2 is an isometric view showing a portion of a truck frame with a portion of the front wheel suspension system related thereto.
FIG. 3 is an exploded isometric view of a portion of the construction illustrated in FIG. 2.
FIG. 4 is an isometric view of a portion of a truck frame with a portion of the driver wheel suspension system related thereto.
FIG. 5 is an exploded isometric view of a portion of the structure shown in FIG. 4.
FIG. 6 is an isometric view of a fifth wheel, as commonly employed in tractor-trailer constructions.

The tractor suspension means illustrated in FIGS. 2 through 4 of the drawings are the most common and widely used form of truck wheel suspension systems or means.

In FIG. 2, of the drawings, I have illustrated a typical front supporting and steering wheel assembly or system. The assembly is shown as including an elongate horizontally disposed axle 10, which axle extends transversely below the forward end of the truck frame D. Brake drums 11 are suitably secured to and carried by the ends of the axle and front wheels 12 are rotatably carried thereby, as illustrated.

The assembly further includes and is yieldingly coupled with the truck frame B by a suitable suspension means, which means includes a flat upwardly disposed spring mounting pad 13 at each end portion of the axle 10, an elongate, semi-elliptical leaf spring 14 related to each pad, with its central belly portion arranged adjacent the pad and its opposite end portions articulatedly coupled with or to the frame D by suitable shackle couplings 15.

The pad 13 is provided with two pairs of openings 16 through which suitable U-bolts 17 are engaged. The U-bolts engage over the spring 14 and serve to hold the spring and pad in tight fixed relationship to each other.

Suitable nuts 18 are provided for the bolts 17, in accordance with common practice.

The front wheel assembly further includes suitable steering gear, which gear, in addition to other means or parts, not shown, includes a tie rod 19.

The assembly now under consideration may further include suitable shock-absorbing means 20, and the like.

With the construction set forth above, it will be apparent that the entire load handled by the front wheel assembly and suspension means or system is transmitted directly between the springs 14 and their related pads 13.

The load weighing apparatus that I provide involves the provision and insertion or installation of transducers between those parts and/or portions of the wheel suspension means on or for the truck, which carry direct loads.

Accordingly, in carrying out my invention and as illustrated in FIGS. 2 and 3 of the drawings, a transducer plate is arranged between the pad 13 and the spring 14, where it is, in addition to being clamped tight between the spring and pad, subjected to the full direct load transmitted through the suspension system.

In the case illustrated, the transducer plate T is coextensive with the pad 13 and is provided with apertures 21 to accommodate the U-bolts 17. The transducer plate is, in the preferred carrying out of the invention, provided with a suitable resistance type load cell and has a pair of pigtails or conductor lines 22 projecting from one side thereof, which lines connect with a suitable circuit, as will hereinafter be described.

The exact nature of the transducer plate T and of the similar transducer plates employed in forms of the invention yet to be considered, and the circuit with which the transducers are related will be considered in greater detail in the following.

It will be apparent from a study of FIG. 2 of the drawings that the direct loads are also exerted in and through the shackle couplings 15, at the ends of the spring 14. Accordingly, transducers can, in an alternative form of the invention, be related to the shackle means, as will hereinafter be described.

In FIG. 4 of the drawings, I have illustrated a typical supporting and driving wheel assembly for a truck tractor.

This assembly is, in essence, and so far as the present invention is concerned, the same as the front wheel assembly and differs therefrom in the following details. The spring pad $13^a$ is fixed to and is carried by an axle housing 23, through which the driven, rotatable axle $10^a$ extends, and the brake drums and wheels (not shown) related thereto, are on fixed axes and are not subject to being turned, as for the purpose of steering.

The spring $14^a$, shackle couplings $15^a$, U-bolts $17^a$ and shock absorbing means $20^a$ are essentially the same as those shown in FIGS. 1 and 2 of the drawings and differ therefrom only with respect to size and details of design.

The above assembly, like the first considered assembly or suspension system, receives and transmits direct loads at the shackle couplings $15^a$ and between the springs $14^a$ and pads $13^a$. Accordingly, in carrying out my invention, a transducer plate T' is positioned above the spring pad $13^a$. In this form of the invention, the pad is proportioned to occur between and within the confines of the U-bolts $17^a$, to be held captive thereby and need not be provided with openings, and the like, to accommodate the bolts.

In practice, the rear wheel suspension means J for the trailer C is essentially the same as the front wheel assembly illustrated and described above, but does not include the steering gear.

Since the system J is so similar, I have chosen not to burden these drawings by illustrating the same and will not burden this specification with further detailed description thereof.

It will suffice to say that the system or means J includes an axle with spring pads thereon, semi-elliptical leaf springs $14^b$ connected with the trailer with or by means of suitable shackle couplings $15^b$. The springs 14 are coupled with the pads in the same or similar manner as the springs 14 are coupled with the pads 13.

As in the previous forms of the invention, transducers are arranged between the springs $14^b$ and their related pads or, alternatively, in the shackle couplings $15^b$, where direct loads are encountered.

In FIG. 6 of the drawings, I have illustrated a typical fifth wheel as is employed in modern tractor-trailer constructions. The fifth wheel includes a substantially round or disc-shaped table 25 having a flat upwardly disposed load supporting surface 26, which surface is usually heavily greased. The table is suitably supported on the rear portion of the truck frame D and is provided with a rearward and upwardly opening king pin receiving slot 27. A suitable releasable king pin engaging jaw mechanism (not shown) is provided within the table to releasably engage the king pin depending from the forward, under side of the trailer C.

In FIG. 7 of the drawings, I have illustrated fifth wheel coupling means K provided at the forward underside of the trailer.

The means K includes a flat load-supporting plate 29 adapted to establish flat sliding and bearing engagement on the top surface 26 of the table 25 and a central downwardly projecting king pin 30, which pin is adapted to slidably enter the notch 27 in the table and to be releasably and rotatably engaged by the jaw means referred to above.

With the above relationship of parts, it will be apparent that the load of the trailer C is exerted directly by the plate 29 on the top surface 26 of the table and that the king pin serves to prevent lateral displacement of the plate and table.

In carrying out my invention, a transducer plate $T^3$ is secured to the bottom, table-engaging surface of the plate 20, about the king pin 30. Alternatively, the transducer plate $T^3$ could be fixed to and carried by the table. In either case, the transducer plate $T^3$ occurs between the plate 29 and table 25 so that it is subjected to the direct loads between said parts.

Figures 2, 8, 9, 10, 11, 12, 18:
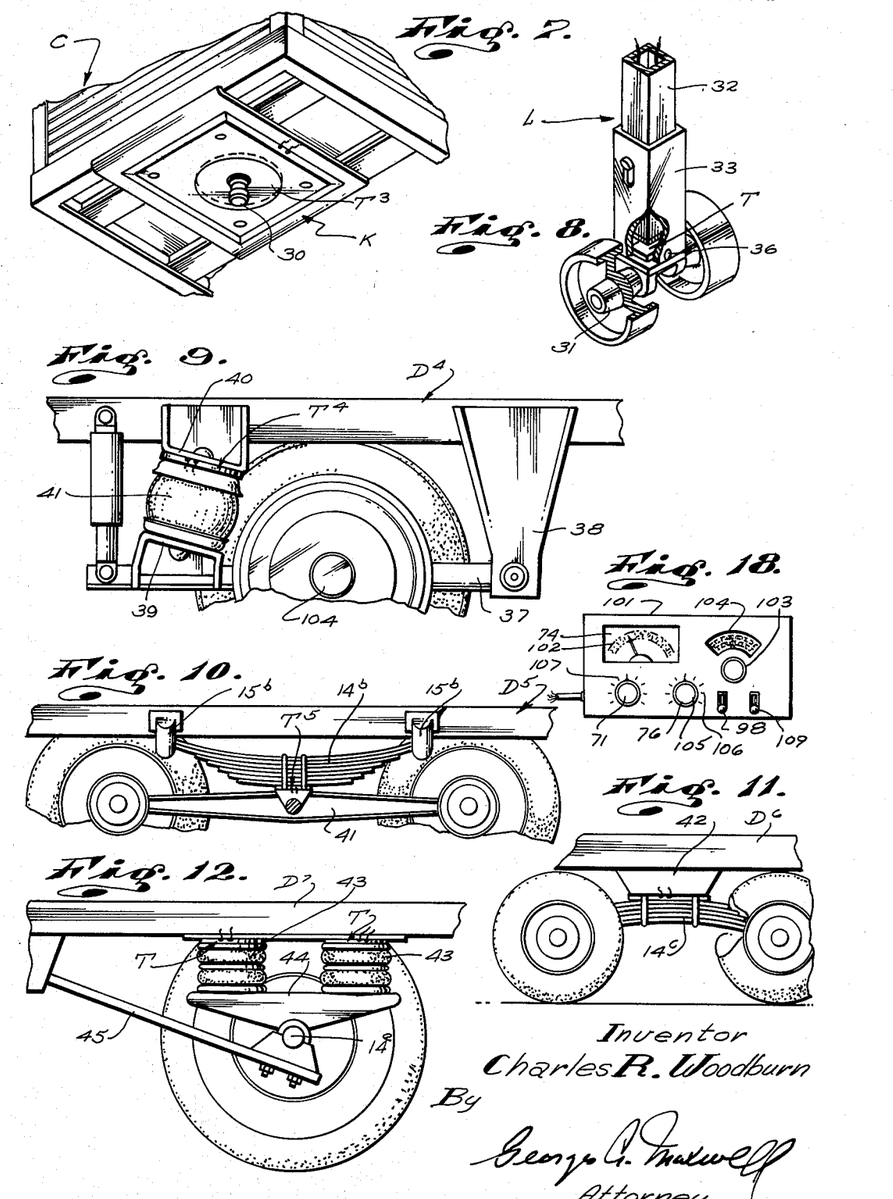
FIG. 8 is an isometric view of a portion of a leg support means as provided by the present invention.
FIGS. 9, 10, 11, 12 and 13 are elevational views of several special suspension systems commonly employed in truck constructions and with which the apparatus provided by the present invention is related.
FIG. 18 is an elevational view of a cabinet in which the electrical circuitry that I provide is arranged.

In FIG. 8 of the drawings I have illustrated the lower end of one support leg L provided for the trailer C. There are many forms and constructions of support legs presently in use. However, to the applicant's knowledge, they all involve an elongate vertically extending column, round or square in cross-section, to the lower ends of which are fixed axles, which axles rotatably carry small supporting wheels. Beyond this point, considerable variations exist, but such variations in no way affect the present invention.

In carrying out the present invention any one of the various forms of support legs can be easily and conveniently modified in the manner illustrated and described in the following. The axle and wheel assembly 31 at the lower end of its related support leg 32 is removed from the leg and is secured to the lower end of an upwardly opening cup-like carrier 33, which carrier is telescopically engaged on the lower end of the leg. The cup-like carrier is retained from displacement with the leg by means of suitable retaining pins 34 carried by the leg and engaged in slot-like openings 35 in the sides of the carriers. A transducer plate $T^4$ is arranged in the carrier between the bottom thereof and the bottom of the leg. The leads or pigtails extending from the transducer plate can be fed through an opening 36 in the side of the carrier, or can be fed through an opening in the bottom of the leg 32 (not shown) and thence upwardly through and out of an opening in the upper end of the leg, as desired, or as circumstances require.

With the above set-up, it will be apparent that the transducer plate $T^3$ is subjected to the entire and direct load exerted through the support leg.

In FIG. 9 of the drawings I have illustrated a special, but widely used, suspension system for trucks. In this system, the axle $10^4$ is fixed to and carried by an elongate, horizontally disposed and longitudinally extending rod 36 arranged below the truck and/or trailer. The forward ends of the rods or rod are pivotally mounted to the frame $D^4$ by means of a suitable depending bracket 38. The rear ends of the rod or rods 37 are provided with upwardly disposed spring pads 39, which pads occur in vertical spaced, opposed relationship with downwardly disposed spring pads 40 on the frame $D^4$. A pneumatic spring or pillow 41 is arranged between the pads 39 and 40. The pneumatic springs or pillows are connected with a suitable air system which is operative to inject air into or lead air from the pillows to raise and lower the frame and its load relative to the axle. With such a structure, it will be seen that the air springs or pillows are subjected to direct loads. Accordingly, and in carrying out the present invention, transducer plates $T^4$ can be advantageously arranged between one or the other ends of the pillows or air springs and their related pads.

In FIG. 10 of the drawings I have illustrated one form of tandem axle suspension system wherein semi-elliptical leaf springs $14^b$ are coupled to the truck frame $D^5$ by suitable shackle couplings $15^b$. Elongate longitudinally extending beams 41 are centrally secured to the belly of the spring $14^b$ and the two axles are suitably secured to the opposite ends of the beams (not shown).

In carrying out my invention with the above type of suspension system, it will be apparent that a transducer plate $T^5$ can be advantageously arranged between the spring and the beam or, alternatively, transducers can be arranged in the shackle coupling means $15^b$, where the direct loads are transmitted.

Figures 12, 14, 16:
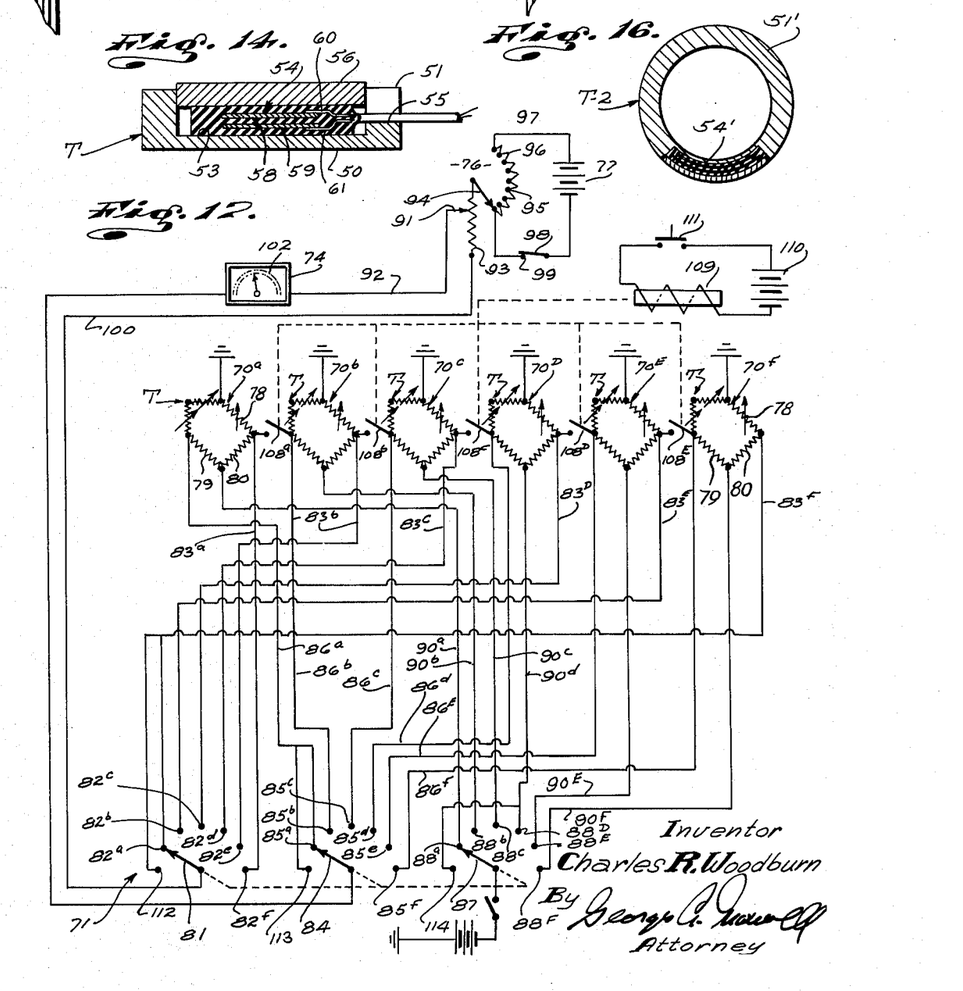
FIG. 14 is an enlarged detailed sectional view of one form of transducer plate provided by the present invention.
FIG. 16 is a sectional view taken as illustrated by line 15—15 on FIG. 14.

In FIG. 14 of the drawings, another widely used form of tandem axle suspension system is diagrammtically illustrated.

In this system, the belly of the semi-elliptical springs 14 is mounted securely to a mounting pad 42 on the frame $D^6$. The axles are suitably rotatably coupled to the ends of the spring.

In this set-up, the transducer plate $T^6$ is arranged between the spring $14^c$ and the pad 42, in carrying out my invention.

In FIG. 12 of the drawings, another widely used system of pneumatic or air suspension is diagrammatically illustrated.

In this system a pair of air springs or pillows 45 is arranged between the frame $D^7$ and suitable spring or pillow pads 44 on the axle $14^e$. The pads are under control of a suitable pneumatic or air system to allow for raising and lowering the frame and its load relative to the axle and to trim the dispositioning of the truck frame.

This system further includes a light, forwardly and upwardly extending stationary leaf spring 45 between the frame and axle to prevent torquing of the axle relative to the frame and pneumatic suspension means.

Again, in this form of suspension system, I place transducer plates $T^7$ between the one or the other of the ends of the air springs or pillows 43 and the frame or their related pads, in carrying out my invention.

Figures 13, 15:
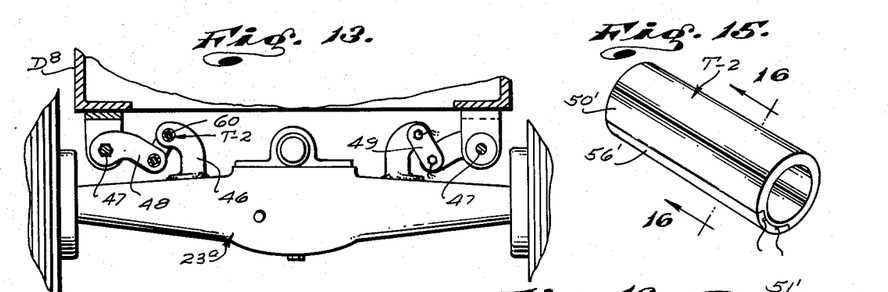
FIG. 15 is an isometric view of a transducer shackle bushing as provided by the present invention.

In FIG. 13 of the drawings, I have diagrammatically illustrated the familiar and widely used torsion bar type of suspension system. In this system, upwardly and outwardly extending perches 46 are fixed to the opposite end portions of the axle or axle housing $23^a$, whichever the case may be. Elongate torsion bars 47 are suitably mounted beneath the frame $D^8$ to extend longitudinally thereof. The bars carry suitable cranks 48 which cranks extend laterally inwardly and beneath the upper outer ends of the perches related thereto. Suitable shackle coupling means 49 pivotally connect and extend between the cranks and the perches, substantially as illustrated.

In this type of suspension system, direct loads are encountered between the frame and the mounting pad for the torsion bars and in the shackle couplings 49. Direct loads are also distributed between the perches and the axles. However, since the perches are ordinarily welded to the axles, the forces exerted therethrough could not be measured in accordance with this invention.

Accordingly, in carrying out my invention, transducer bushings can be provided in the shackle couplings, transducer plates can be provided between the frame and torsion bar mounting means, as described or as circumstances require.

From the foregoing, it will be noted that in all suspension systems presently employed in the trucking industry, there are a very limited number of locations where-direct loads are encountered. In the case of systems employing semi-elliptical leaf springs, direct loads are encountered at the spring mounting pads on the axles and in the shackle couplings.

In carrying out my invention, the use of transducer plates between the springs pads and the springs is preferred to the alternative provision of transducer bushings in the shackle coupling means, since but two plates are required and at least four bushings would be required. However, in the case of the torsion bar system illustrated in FIG. 13, two transducer bushings would be required in the shackle couplings 49 and a greater number of transducer plates would be required due to the unique manner in which the torsion bars are mounted (not shown).

In view of the fact that it is desirable, in carrying out my invention, to maintain the number of transducers at a minimum, the use of transducer plates, as will hereinafter be described, is preferred, since as a general rule the number of plates required is minimal.

FIG. 14 is a transverse sectional view of a typical transducer plate T, as provided by the present invention. The plate structure T includes a lower pressure plate 50 having a flat work engaging bottom surface 51 and a top surface 52. A central upwardly opening socket 53 entering the top surface and in which a variable resistance type transducer 54 is arranged. The structure T further includes an upwardly opening laterally extending lead receiving channel 55 in the top surface of the bottom plate and communicating with the socket, and an upper pressure plate 56 engaged in the socket in flat bearing engagement on the transducers 54 therein.

In the case illustrated, the transducer 54 includes a resilient rubber or synthetic rubber block 57 having known dielectric characteristics, a pair of metal plates 58 and 59 bounded in the block in predetermined, parallel spaced relationship and on planes at right angles to the vertical axis of the plate.

The cumulative vertical extent of the plate 56 and block 57 is greater than the vertical extent of the socket 53. The plan configuration of the plate 56 is substantially equal with the plan configuration of the socket, whereby the plate slidably enters the socket. The block 57 is smaller in plan configuration than the plate 56 and the socket and is arranged centrally therein with considerable clearance provided between the outer periphery of the block and the opposing side walls of the socket.

With the relationship of parts set forth above, it will be apparent that the upper and lower pressure plates are suitably maintained in vertical alignment and against lateral displacement by the interengaged relationship of the plate 56 in the socket 53 and that the said plates are free to shift vertically relative to each other. It will be further apparent that the transducer 54 is held captive between the plates 50 and 56 and that the block thereof is free to flow laterally when compressed vertically, due to the clearance provided in the socket and about the perimeter of the transducer.

In addition to the foregoing, the transducer is provided with a pair of lines or leads 60 and 61, which leads extend laterally outwardly through the channel 55 in the plate 50 and connect with the suitable bridge circuit, as will be described hereinafter.

In practice, the transducer plate T is arranged in tight clamped engagement between the two opposing or related parts of the suspension means with which it is related. This clamping operation initially compresses and deforms the block to a considerable extent and affects or alters the resistance between the plates 58 and 59. However, this initial alteration of the resistance of the transducer can be readily determined and can be adjusted or compensated for by means of a variable resistance in one of the lines extending from the transducer of its related bridge circuit, or by the provision of a variable resistance in one leg of the bridge circuit related to the transducer, as desired or as circumstances require. In the event that two or more transducers T are related in series to a single bridge circuit, it may be necessary to adjust each transducer separately or independently by means of a variable resistor related to each of said transducers. In the circuit diagram shown in FIG. 17 of the drawings, I have indicated pairs of transducers T arranged in series in each bridge. However, I have not shown each of said transducers provided with an independent variable resistor, as suggested above. Instead, and for the sake of simplicity, I have shown the bridge related to each pair of transducers provided with a variable resistance in one leg thereof, which is operable to make the necessary above-mentioned adjustment.

Once the transducer or transducers T are engaged in their related suspension systems, it will be apparent that upon application of additional vertical forces thereon, as for example, the forces generated or created by a load applied to the vehicle, further limited but uniform vertical compression and lateral displacement of the rubber block and resulting vertical shifting of the plates and proportional variations of resistance, is affected.

In FIGS. 15 and 16 of the drawings, I have shown another form of transducer $T^2$. This form of transducer is in the nature of a shackle pin bushing and is such that is can be advantageously employed in any desired shackle coupling means for vehicle suspension systems. It is to be noted that all shackle type coupling means employed in vehicle suspension systems include pin bushings as standard parts.

In such couplings, the bushings are rotatably stationary or fixed and serve to provide a bearing surface in which the shackle pins are free to rotate.

Since shackle couplings of the general character referred to are extremely common and well known throughout the many arts, and since it would serve no useful purpose to illustrate and describe such a coupling means in detail, I have elected to illustrate the relationship of the shackle pins and bushings in a very general fashion, at the left-hand side of FIG. 13 of the drawings, where certain parts of the suspension means there provided have been removed to show the shackle pins 60 and the bushings $T^2$ related thereto, in section.

The bushing type transducer $T^2$ that I provide is essentially the same as the transducer T, described in the foregoing, and distinguishes therefrom only in that one of the pressure members 50′ is tubular and establishes a bearing surface for the shackle pin to be related thereto, and the other pressure member or plate 56′ is a curved plate and cooperatively engages and seats in the opening or openings in the component parts of the shackle coupling normally provided to accommodate a conventional shackle pin bushing or sleeve.

When substituting a bushing or sleeve type transducer $T^2$ for a conventional shackle pin bushing, it is only necessary to properly rotatably orient the bushing so that the transducer 54′ and the member or plate 56′ of the transducer are in proper rotative position to receive the direct loads exerted between them and through the pin and the component parts of the coupling related thereto.

In FIG. 17, I have illustrated a preferred circuit for carrying out the present invention whereby the load upon any individual axle or the load exerted through the suspension system to any related pair of wheels, or the total load on all of the axles and/or wheels may be readily ascertained.

The circuit illustrated basically comprises a number of bridge circuits $70^a$ through $70^f$. Through the use of a number of selector switches 71, 72 and 73, any of the aforementioned bridge circuits may be selectively placed in circuit with a galvanometer 74, a potentiometer 75, a range switch 76 and a voltage source 77. The circuit as disclosed shows the bridge circuit $70^a$ connected in circuit.

The bridge circuit $70^a$ comprises the variable resistance load cells T related to one axle, in series, a variable resistor 78 and a pair of standard fixed resistors 79 and 80. Each of the bridge connections $70^b$ to $70^f$ similarly comprises the group of series related resistance load cells related to one axle or suspension system, a variable resistor and a pair of standard fixed resistors.

The selector switch 71 is manually operated and serves to determine which of the bridge circuits will be connected in circuit. The selector switches 72 and 73 are mechanically connected to the selector switch 71. The selector switch 71 comprises a movable contact 81 and a plurality of fixed contacts $82^a$ through $82^f$. The contact $82^a$ is connected to one side of the bridge $70^a$ by the lead $83^a$.

The selector switch 72 comprises a movable contact arm 84, and a plurality of fixed contacts $85^a$ through $85^f$. The fixed contact $85^a$ is connected to the other side of the bridge circuit $70^a$ by means of the lead $86^a$.

The selector switch 73 is used to ground the bridge circuits. This selector switch 73 comprises a movable contact arm 87 and a plurality of fixed contacts $88^a$ through $88^f$.

Each of the bridge circuits $70^a$ through $70^f$ has two ground connections. The bridge connection $70^a$ has one side permanently grounded at 89. Each of the remaining bridges has a similar permanent ground. The side of the bridge circuit opposite the permanent ground connection is connected by means of a lead $90^a$ to the contact $88^a$ of the selector switch 73. Consequently, it will be seen that when the bridge circuit $70^a$ is in series with the galvanometer to give a reading as indicated, the bridge circuit $70^a$ is at the same time fully grounded. Correspondingly indicated leads $90^b$ through $90^f$ connect the remaining bridge circuits with the selector switch 73.

It is necessary that both sides of any bridge which is being read be grounded because of the ever-present possibility that a charge of static electricity would build up on the truck when the truck is traveling on the highway. The static charge in turn would affect the accuracy of the readings at the various bridges. Consequently, in order to properly ground each circuit when a reading is being made therefrom, the selector switch 73 will be automatically connected to the side of the birdge circuit which is connected in circuit with the galvanometer 74. This result occurs because, as pointed out above, the selector switches 72 and 73 are mechanically connected to the selector switch 71, which is mounted on a suitable control panel. Returning now to the control elements of the circuit, the galvanometer 74 is connected in series to a movable arm 91 on the potentiometer 75 by means of a lead 92. The potentiometer 75 comprises a resistance 93 which has one end connected with the range switch 76. The range switch 76 comprises a movable contact arm 94 which arm cooperates with a number of fixed contacts 95 which are spaced along the resistance element 96. The movable arm of the range switch is connected to one side of the resistance 93. One side of the resistance element 96 of the range switch is connected to the voltage source 77 by means of a lead 97. A manually operated switch 98 is connected to the other side of the voltage source 46. Fixed contact 81 of the switch 98 is then connected to the movable arm 81 of the selector switch 71 by means of a lead 60. The contact 99 is also connected to one end of the resistance 93 and one end of the resistance 96.

Referring now to FIG. 18, I have illustrated a cabinet for arrangement in the cab of the truck, a cabinet in which the circuit is arranged, which cabinet is provided with a control panel 101 in which the control elements are mounted. The galvanometer 74 is provided with a deflection scale 102. As the mode of operation of this invention comprises balancing the galvanometer against the external resistance in the circuit, it is only necessary that a zero deflection point be noted on the scale. The potentiometer has a rotatable handle 103. The potentiometer is further provided with a plurality of calibrated scales 104 fixed to the handle. The plurality of scales correspond with the plurality of the positions on the range switch. The scales are so calibrated that the readings thereon, when the galvanometer is at zero deflection with certain external resistance in the galvanometer circuit, will give the load on the series of related cells.

The selector switch 86 located in the control panel has a rotatable handle 105. Several positions 106 are indicated about the periphery of the handle. As the total load which can be indicated by this invention will vary from the load on one axle to the load on all of the axles or related suspension systems, if such be the case, it can be seen that this system must operate over a wide range of resistances. Consequently, by selecting the correct position with the selector switch, it is possible to insure that the deflection of the galvanometer will fall within the scale 102. When this rough adjustment has been made, a finer adjustment is then made with the potentiometer 75.

The selector switch 71 is also mounted on the control panel. This switch is provided with a plurality of positions 107 which correspond to each of the individual axles or suspension systems on the truck.

Also mounted on the control panel is the switch 98 which energizes the circuit, and switch 107 which connects the movable contact arm on the selector switch 73 with ground.

It will be noted that the bridge circuit 70ᵃ is connected in circuit with the galvanometer 43. With this connection, reading may be obtained of the load on the related axle. The load on the axle will cause the resistance load cell T related thereto to be acted upon an amount proportionate to the load imposed upon the axle. This load upon the cells will in turn vary the resistance across the gage. This change in resistance from the cells will result in variation of the total impedance across the bridge connection 70ᵃ.

This variation of impedance across the bridge circuit 70ᵃ will in turn result in variations of the current flow to the galvanometer. This change in current will cause a deflection of the galvanometer from the zero point. The range switch is then adjusted to correct position in order to insure that deflection of the needle of the galvanometer remains within the scale thereof. When this adjustment has been made, the potentiometer is then adjusted to bring the pointer of the galvanometer to zero point on the scale. With the galvanometer reading zero, the load on the axle is then read directly from the appropriate scale 75 of the potentiometer.

By adjusting the selector switch 40 to each one of the contacts 82ᵃ through 82ᶠ, the same process is followed to obtain the load reading on each of the individual axles or related suspension systems.

A plurality of switches 108ᵃ through 108ᵉ, which are simultaneously actuated by a relay 109, are placed in the circuit in a manner to be fully described. The relay 109 has in circuit therewith a voltage source 110 and a manually operated switch 111. The relay 109 is mechanically coupled to each one of the switches 108ᵃ through 108ᵉ in such a manner that when the switches 108ᵃ through 108ᵉ are opened, actuation of the relay will cause the switches to close, and when the switches 108ᵃ through 108ᵉ are closed, actuation of the relay will result in the switches being opened.

The switch 108ᵃ is interposed between the bridge circuits 70ᵃ through 70ᶠ in such a manner that when the switch 108ᵃ is closed, the bridge circuits are connected in series with each other. The remaining switches 108ᵇ through 108ᵉ are likewise interposed between the remaining bridge circuits in the manner illustrated.

When all of the switches 108ᵃ through 108ᵉ are closed, the bridge circuits 70ᵃ through 70ᶠ are serially connected with each other.

There is placed in the selector switch 71 a contact 112. This contact is connected by means of leads 113 to the bridge circuit 70ᶠ.

The selector switch 72 has a fixed contact 113. The contact 113 is connected to the bridge circuit 70ᵃ.

The selector switch 73 is provided with a fixed contact 114 which contact is connected to the lead 90ᵈ. Consequently, when the movable arm 87 of the selector switch 73 is in contact with the fixed contact 114, the serially connected bridge circuits 70ᵃ through 70ᶠ are mounted.

To determine the total load on the axles or suspension systems of the truck, the manually operated switch 111 is pushed so that the relay 109 is actuated. This causes the switches 108ᵃ through 108ᵉ to close and the bridge circuits 70ᵃ through 70ᶠ are serially connected. The selector switch 71 is then moved so that the movable arm 81 is in contact with the fixed contact 82. As the selector switches 71 and 72 are mechanically connected to the selector switch 70, the respective movable arms of the selector switches 71 and 72 will be connected to the fixed contacts 113 and 114, respectively. With this connection it can be seen that a reading is being obtained of the total impedance of the bridge circuits 70ᵃ through 70ᶠ. This load reading is obtained in the manner similar to that described in connection with the determination of a load across an individual bridge circuit.

Thus it can be seen that this invention provides a simplified, easy, accurate and dependable apparatus for determining the exact loads on an individual axle or the total load of a vehicle.

Having described only typical preferred forms and applications of my invention, I do not wish to be limited to the specific details herein set forth, but wish to reserve to myself any modifications and variations that may appear to those skilled in the art and which fall within the scope of the following claims:

Having described my invention, I claim:

1. In a vehicle having an upper load supporting structure in the form of an elongate, horizontal frame and a lower load supporting structure in the form of an elongate, horizontal axle with road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, a bridge circuit related to each load cell with one leg thereof comprising said load cell, a galvanometer connected with said bridge circuit and a calibrated means related to the galvanometer to give the load reading on the bridge circuit whereby the work load transmitted through the load cell can be accurately determined.

2. In a vehicle having an upper load supporting structure in the form of an elongate, horizontal frame and a lower load supporting structure in the form of an elongate, horizontal axle with road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, said load cells being connected in series, a bridge circuit with one leg thereof comprising said series connected load cells, a galvanometer connected with said bridge circuit and a calibrated means related to the galvanometer to give the load reading on the bridge circuit whereby the work load transmitted through the load cells can be accurately determined.

3. In a vehicle having an upper load supporting structure in the form of an elongate, horizontal frame and a lower load supporting structure in the form of an elongate, horizontal axle with road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, a bridge circuit related to each load cell with one leg thereof comprising said load cell, a galvanometer connected with said bridge circuit and a calibrated means related to the galvanometer to give the load reading on the bridge circuit whereby the work load transmitted through the load cell can be accurately determined, said resilient means including an elongate, longitudinally extending elliptical leaf spring, said member of said coupling means between the lower support structure and the spring including a U-shaped clamp member engaged over and depending from the central portion of the spring, the part of said coupling means between the spring and the lower support structure including a flat, upwardly disposed plate opposing the central portion of the leaf spring and connected with said clamp member, the load cell related to said clamp member and plate being in the form of a flat plate-like unit arranged between the plate and the spring.

4. In a vehicle having an upper load supporting structure in the form of an elongated, horizontal frame and a lower load supporting structure in the form of an elongate, horizontal axle with road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, said load cells being connected in series, a bridge circuit with one leg thereof comprising said series connected load cells, a galvanometer connected with said bridge circuit and a calibrated means related to the galvanometer to give the load reading on the bridge circuit whereby the work load transmitted through the load cells can be accurately determined, said resilient means including an elongate, longitudinally extending elliptical leaf spring, said member of said coupling means between the lower support structure and the spring including a U-shaped clamp member engaged over and depending from the central portion of the spring, the part of the said coupling means between the spring and the lower support structure including a flat, upwardly disposed plate opposing the central portion of the leaf spring and connected with said clamp member, the load cell related to said clamp member and plate being in the form of a flat plate-like unit arranged between the plate and the spring.

5. In a vehicle having an upper load supporting structure in the form of an elongate, horizontal frame and a lower load supporting structure in the form of an elongate, horizontal axle wih road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, a bridge circuit related to each load cell with one leg thereof comprising said load cell, a galvanometer connected with said bridge circuit and a calibrated means related to the galvanometer to give the load reading on the bridge circuit whereby the work load transmitted through the load cell can be accurately determined, said resilient means including an elongate, longitudinally extending elliptical leaf spring, the member of said coupling means between the upper support structure and the spring including an apertured member at each end of the spring, the part of said coupling means between the spring and the upper support structure including an apertured part related to each member and fixed to said upper support structure, a shackle plate extending between each related part and member and a shackle pin engaged through each part and member and through openings in the related shackle plates, the load cell related to each coupling means including a tubular carrier sleeve with a load cell receiving recess at one side thereof, said sleeve being engaged about one of the shackle pins and engaged in the aperture through which said pin extends with its recess disposed in the direction in which the forces are transmitted onto and through the pin, said load cell being in the form of an arcuate insert and arranged in the recess in the sleeve to establish direct bearing engagement in its related aperture.

6. In a vehicle having an upper load supporting structure in the form of an elongate, horizontal frame and a lower load supporting structure in the form of an elongate, horizontal axle with road engaging wheels at its opposite ends and extending transverse of and spaced below the upper load supporting structure, and suspension means adjacent each end of the lower support structure and connecting the two load supporting structures together, each of said suspension means including a vertically shiftable resilient means arranged and extending vertically between the related structures, coupling means between each of said structures and the resilient means, each coupling means including a load transmitting part fixed to the resilient means, a load transmitting member fixed to the adjacent supporting structure and opposing and engageable with said part and fastening means securing the part and member together, the full work load between the two load supporting structures being transmitted directly by and between the parts and members related to each of said structures, a variable resistance load cell arranged between the parts and members of the coupling means related to one of said load supporting structures to transmit the vertical work load therebetween, said load cells being connected in series, a bridge circuit with one leg thereof comprising said series connected load cells, a galvanometer connected with said bridge circuit and a calibrated means related to the galvanometer to give the load reading on the bridge circuit whereby the work load transmitted through the load cells can be accurately determined, said resilient means including an elongate, longitudinally extending elliptical leaf spring, the member of said coupling means between the upper support structure and the spring including an apertured member at each end of the spring, the part of said coupling means between the spring and the upper support structure including an apertured part related to each member and fixed to said upper support structure, a shackle plate extending between each related part and member and a shackle pin engaged through each part and member and through openings in the related shackle plates, the load cell related to each coupling means including a tubular carrier sleeve with a load cell receiving recess at one side thereof, said sleeve being engaged about one of the shackle pins and engaged in the aperture through which said pin extends with its recess disposed in the direction in which the forces are transmitted onto and through the pin, said load cell being in the form of an arcuate insert and arranged in the recess in the sleeve to establish direct bearing engagement in its related aperture.

References Cited by the Examiner

UNITED STATES PATENTS

| | | | |
|---|---|---|---|
| 2,472,214 | 6/1949 | Hurvitz | 73—398 X |
| 2,614,416 | 10/1952 | Hollmann | 73—133 |
| 2,630,007 | 3/1953 | Howe et al. | 73—88.5 |
| 2,725,548 | 11/1955 | Harris | 73—398 X |
| 2,813,709 | 11/1957 | Brier | 177—137 |
| 2,931,638 | 4/1960 | Weber | 177—211 X |
| 2,951,817 | 9/1960 | Myers | 252—511 |
| 3,146,839 | 9/1964 | Carlson | 177—136 |
| 3,172,492 | 3/1965 | Sobatka et al. | 177—136 |

FOREIGN PATENTS 669,547  8/1963  Canada.

LEO SMILOW, *Primary Examiner.*